United States Patent
Chiang

[11] Patent Number: 5,549,396
[45] Date of Patent: Aug. 27, 1996

[54] BICYCLE CRANK AXLE

[76] Inventor: Douglas Chiang, 487, Ko-Chung Rd., Ta-Li City, Taichung Hsien, Taiwan

[21] Appl. No.: 441,875

[22] Filed: May 16, 1995

[51] Int. Cl.$^6$ .............................. F16C 9/02; B62K 19/34
[52] U.S. Cl. ............................................. 384/545; 384/540
[58] Field of Search ..................................... 384/458, 457, 384/544, 545, 538; 74/594.1, 594.2

[56] References Cited

U.S. PATENT DOCUMENTS

| | | | |
|---|---|---|---|
| 637,205 | 11/1899 | Heath | 384/545 |
| 4,358,967 | 11/1982 | Kasten | 74/594.2 |
| 4,545,691 | 10/1985 | Kasten et al. | 384/458 |
| 4,552,468 | 11/1985 | Hopper, Jr. | 384/540 X |
| 5,209,581 | 5/1993 | Nagano | 384/540 X |
| 5,303,611 | 4/1994 | Chi | 384/540 X |

*Primary Examiner*—Thomas R. Hannon
*Attorney, Agent, or Firm*—Larson and Taylor

[57] ABSTRACT

A bicycle crank axle comprises two fitting shafts located respectively at both ends thereof. One of two fitting shafts is provided with a stopping block while another one of the two fitting shafts is provided with a threaded portion. Two fitting shafts are fitted respectively into a tapered sleeve engageable with a tapered bearing which is fastened with a tapered fixation seat. The threaded portion of the crank axle is engageable with a fastening nut by which the crank axle can be fixed with ease and precision.

1 Claim, 4 Drawing Sheets

BICYCLE CRANK AXLE

FIELD OF THE INVENTION

The present invention relates generally to a bicycle, and more particularly to an improved crank axle of the bicycle.

BACKGROUND OF THE INVENTION

As shown in FIG. 1, a bicycle crank axle 1A of the prior art is provided respectively on both ends thereof with a threaded portion 2A engageable with a bearing 3A which is fastened with the outer end of the frame tube 6A by means of a washer 4A and a fastening nut 5A.

Such a prior art crank axle 1A as described above is defective in design in that the crank axle 1A is rather complicated in construction, and that the threaded portion 2A of the crank axle 1A is highly vulnerable to damage or jamming, and further that the crank axle 1A can not be made economically.

SUMMARY OF THE INVENTION

It is therefore the primary objective of the present invention to provide an improved bicycle crank axle, which is simple in construction.

It is another objective of the present invention to provide an improved bicycle crank axle, which is relatively cost-effective.

It is still another objective of the present invention to provide a bicycle with a durable crank axle.

In keeping with the principle of the present invention, the foregoing objectives of the present invention are attained by an improved bicycle crank axle comprising two fitting shafts located respectively at both ends thereof. One of the two fitting shafts is provided with a stopping block while another one of the two fitting shafts is provided with a threaded portion. Two fitting shafts are fitted respectively into a tapered sleeve engageable with a tapered bearing which is fastened with a tapered fixation seat.

The threaded portion of the crank axle is engageable with a fastening nut. The crank axle can be therefore fixed easily by tightening the fastening nut which is engaged with the threaded portion of the crank axle.

The foregoing objectives, features and advantages of the present invention will be more readily understood upon a thoughtful deliberation of the following detailed description of a preferred embodiment of the present invention in conjunction with the accompanying drawings.

DETAILED DESCRIPTION OF THE INVENTION

Figure 1:
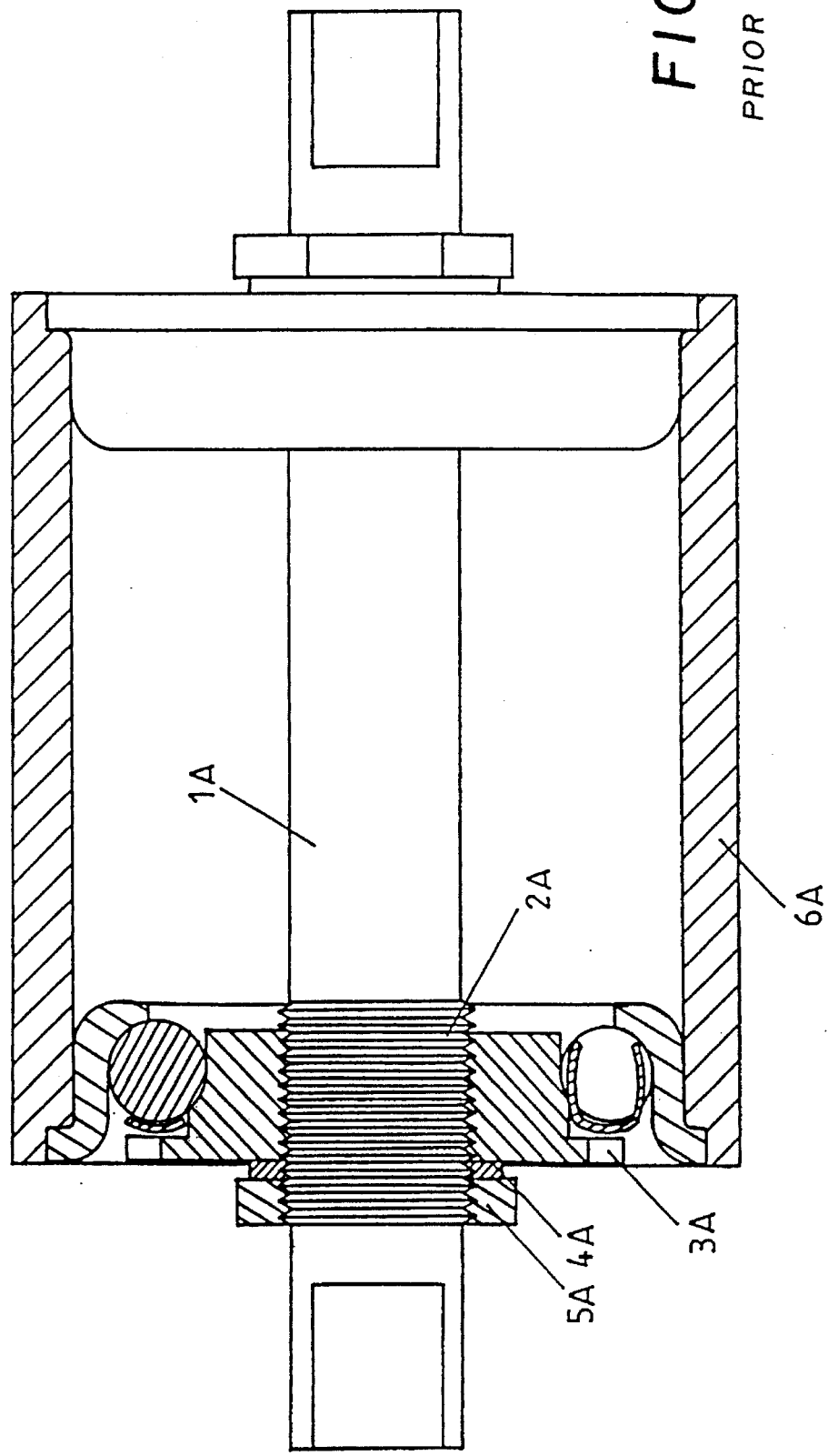
FIG. 1 is schematic view showing that a prior art bicycle crank axle is fastened with the bicycle frame.
Figure 2:
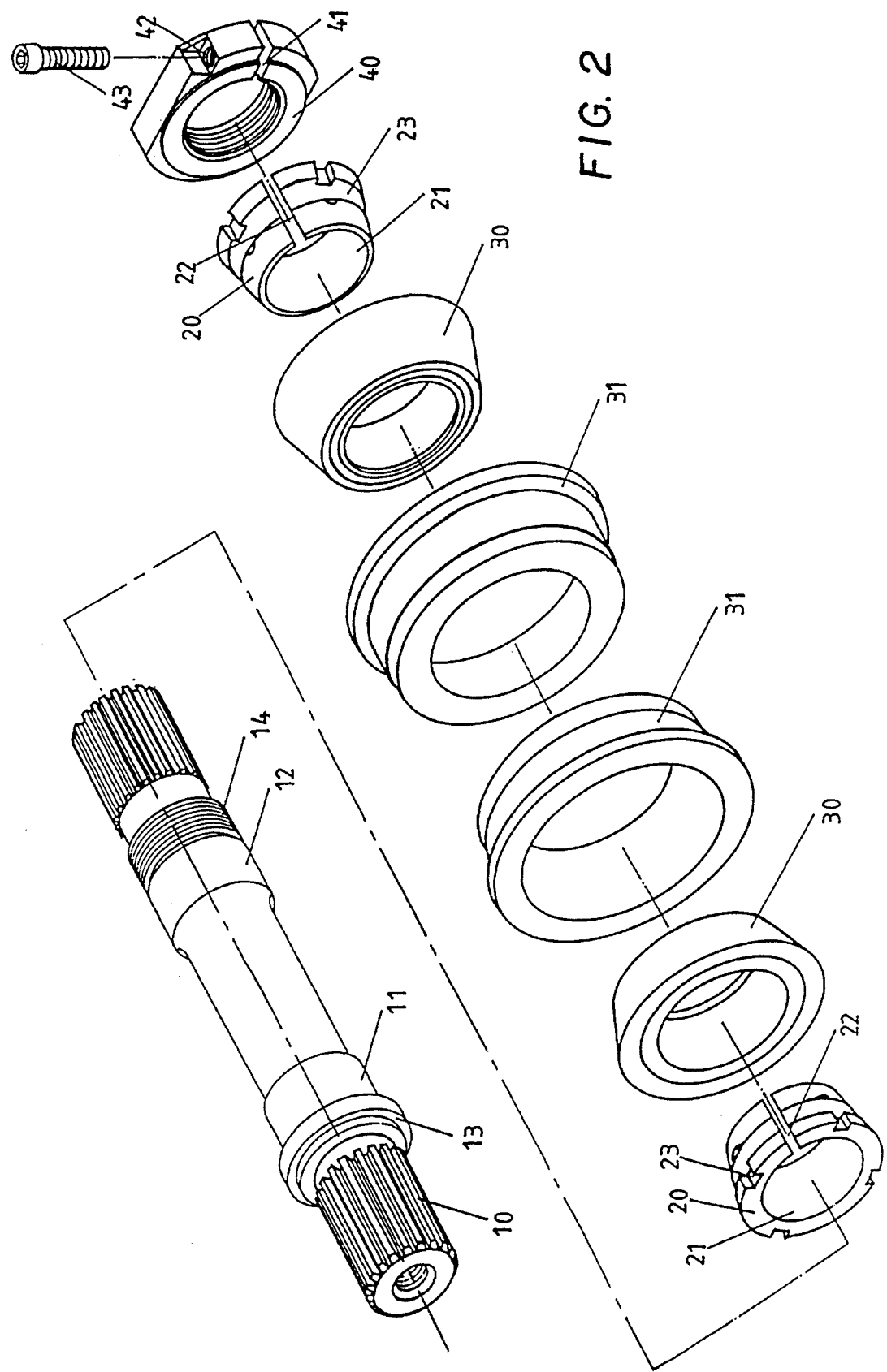
FIG. 2 shows an exploded view of a bicycle crank axle embodied in the present invention.
Figure 3:
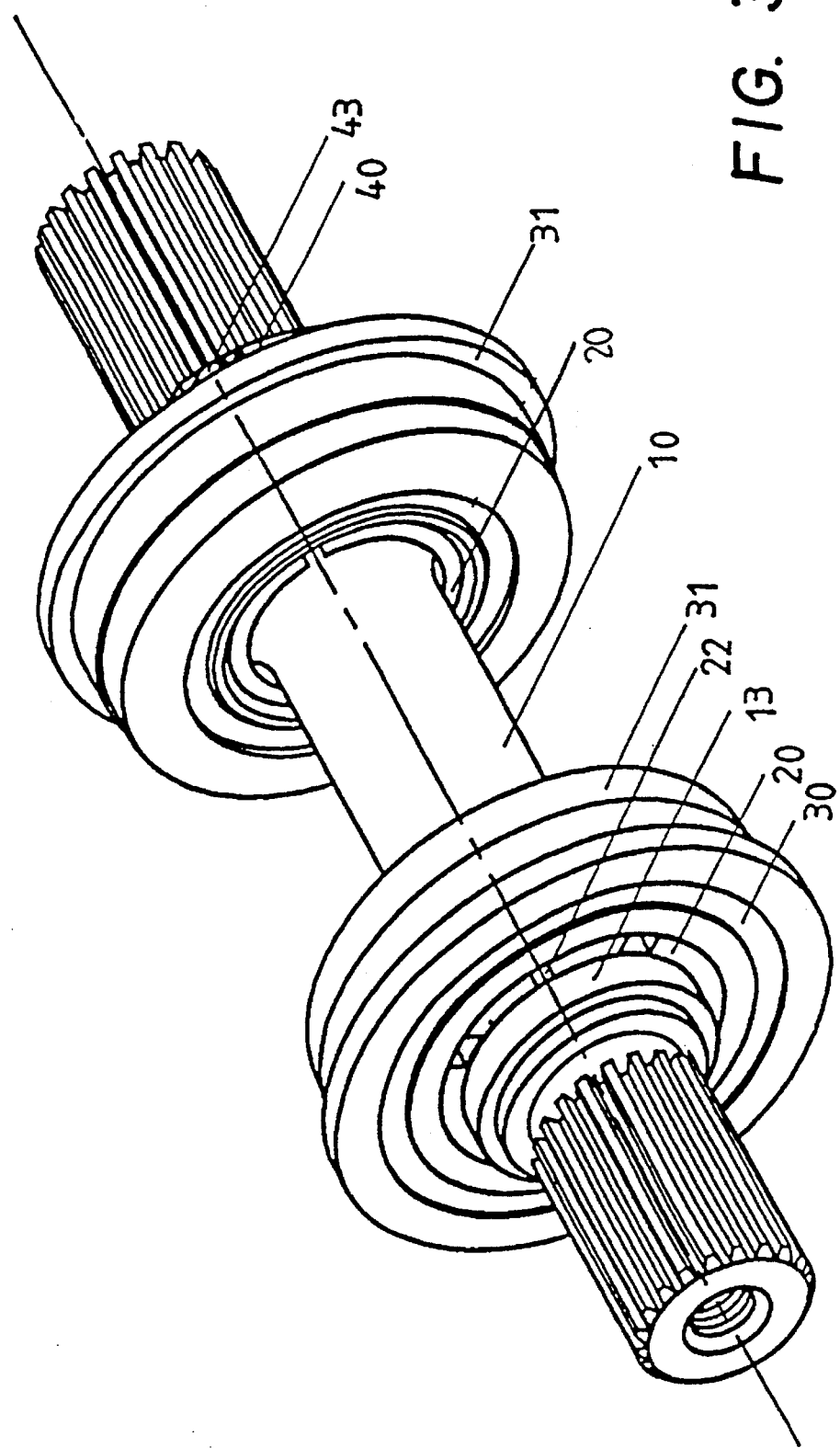
FIG. 3 shows a perspective view of the bicycle crank axle in combination according to the present invention.

As shown in FIGS. 2, and 3, a bicycle crank axle 10 embodied in the present invention is provided at both ends thereof with fitting shafts 11 and 12. The fitting shaft 11 is provided with a stopping block 13 while the fitting shaft 12 is provided with a threaded portion 14. The fitting shafts 11 and 12 are fitted respectively into the axial hole 21 of a tapered sleeve 20. Located at one end of the tapered sleeve 20 is an indentation 22. In addition, the tapered sleeve 20 is provided peripherally with a conical recess 23. Both tapered sleeves 20 are fitted respectively into a tapered bearing 30 which is in turn engageable with a tapered fixation seat 31. The threaded portion 14 is engageable with a fastening nut 40 which is provided with a cut 41 and a threaded hole 42 engageable with a fixation rod 43.

Figure 4:
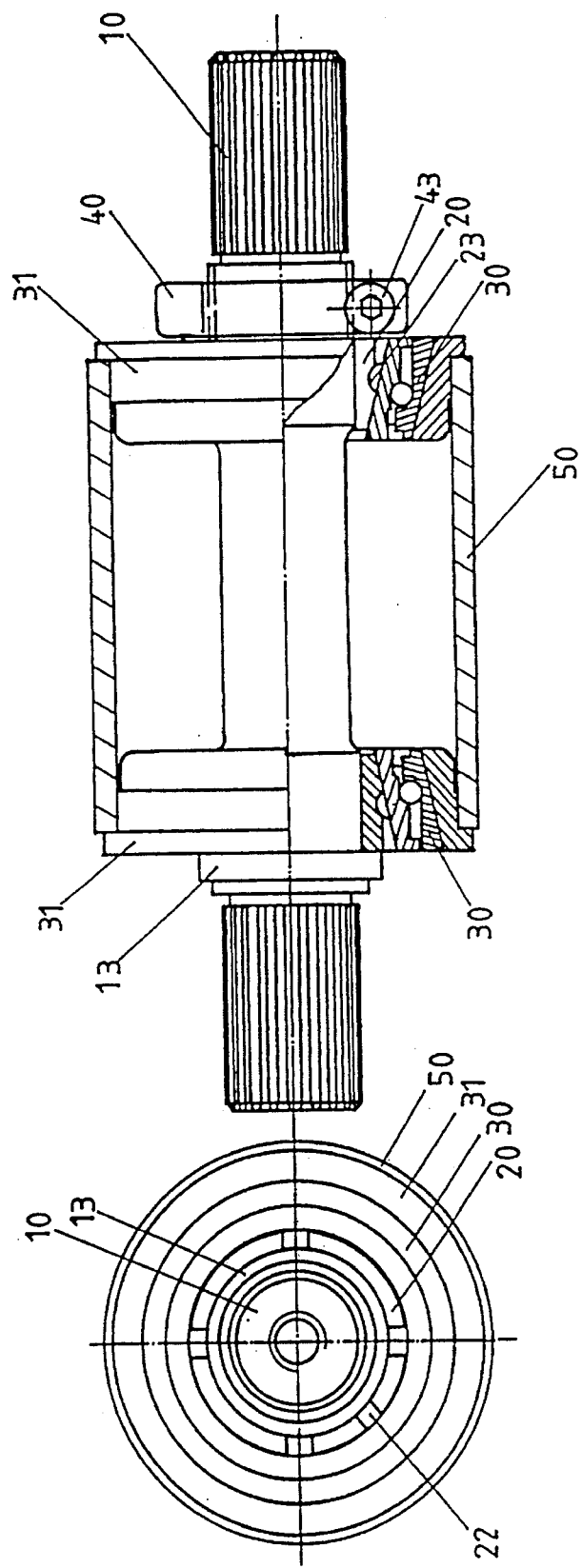
FIG. 4 shows a sectional view of the bicycle crank axle as shown in FIG. 3.

As shown in FIG. 4, the crank axle 10 of the present invention is fastened with a bicycle frame tube 50 such that the fitting shaft 11 of the crank axle 10 is fitted into the tapered sleeve 20, which is in turn fitted into the tapered bearing 30 engaging the tapered fixation seat 31, and that the fitting shaft 12 of the crank axle 10 is fitted into another tapered sleeve 20, which is in turn fitted into the tapered bearing 30 engaging another tapered fixation seat 31. As the fastening nut 40 is fastened with the threaded portion 14, the stopping block 13 of the fitting shaft 11 is pushed against the tapered sleeve 20 so as to fasten the crank axle 10 securely with the frame tube 50. The fastening of the crank axle 10 with the frame tube 50 can be further reinforced by fastening the fixation rod 43. The crank axle 10 is fastened with the frame tube 50 with precision, thanks to the tapered sleeves 20 which are provided respectively with the indentation 22 and the conical recess 23.

It is therefore readily apparent that the crank axle 10 of the present invention is relatively simple in construction and can be easily assembled. In addition, the crank axle 10 of the present invention can be made at a relatively low cost.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claim.

What is claimed is:

1. A bicycle crank axle comprising an axle having two fitting portions, with one of said two fitting portions being provided with a stopping block, and with another one of said two fitting portions being provided with a threaded portion engageable with a fastening means having peripherally a cut and a threaded hole engageable with a fixation rod, said two fitting portions fitted respectively into a tapered sleeve which is provided at one end thereof with an indentation and is further provided peripherally with a conical recess, said tapered sleeve being engageable with a tapered bearing which is in turn engageable with a tapered fixation seat.

* * * * *